Nov. 17, 1953    H. E. HOLMAN    2,659,241
SCREW AND NUT MECHANISM
Filed Aug. 9, 1951

Inventor
HERBERT EDWARD HOLMAN
By Ralph E. Atherton
Attorney

Patented Nov. 17, 1953

2,659,241

UNITED STATES PATENT OFFICE 2,659,241

SCREW AND NUT MECHANISM

Herbert Edward Holman, West Drayton, England, assignor to Electric & Musical Industries Limited, Hayes, England, a British company Application August 9, 1951, Serial No. 241,123

Claims priority, application Great Britain August 18, 1950

7 Claims. (Cl. 74—459)

This invention relates to screw and nut mechanisms, in which relative movement between two parts coupled respectively to a screw and a nut is effected as a result of relative angular movement between the screw and the nut. In a high precision mechanism of this type such as may be required, for example, in a ruling machine, a measuring machine of the micrometer type, or an electron discharge device incorporating a cavity resonator tuned by adjustment of a piston, the pitch of the screw and nut requires to be very fine, and any slight irregularities in the pitch of the screw gives rise to errors in the mechanical transmission.

One method of overcoming the afore-mentioned errors is to employ a nut of relatively great axial length so that it engages an abnormally large number of threads on its associated screw, but this expedient necessitates the provision of a considerable clearance between the screw and nut at least equal to the axial magnitude of all of the irregularities. Such clearance, itself, produces errors in transmission due to backlash and the arrangement cannot be utilised if the nut is to fit closely on the screw.

The object of the invention is to provide a screw and nut mechanism, and a nut device therefor, which reduces or over-comes the effect of irregularities in the threads of the screw or nut, or both, whilst maintaining a high precision in the mechanical transmission.

According to one feature of the invention there is provided a nut device comprising three or more individual coaxial nuts each provided with a helical thread, said nuts being spaced apart and incapable of rotation relative to one another, but mounted for limited movement relative to one another in the axial direction of the helical threads, against the restoring force of resilient means associated with said individual nuts.

The invention also provides a screw and nut mechanism comprising a cage within which said individual nuts are spaced from each other and from the end walls of said cage by interposed resilient members.

In apparatus incorporating a screw and nut mechanism according to the invention in which said screw and said nut device are coupled to parts of said apparatus such that relative rotation between said screw and said nut device results in relative movement between the parts of said apparatus, the arrangement is such that relative movement takes place only if the majority of said individual nuts move relatively to said screw to substantially the same extent.

Figure 1:
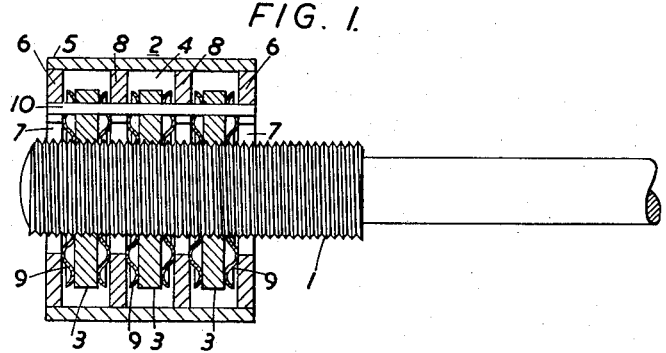
Figure 2:
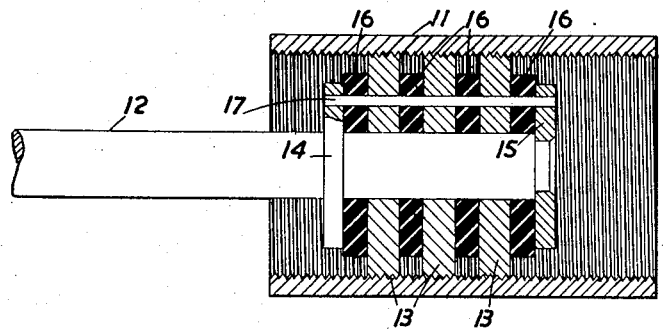

In order that the said invention may be clearly understood and readily carried into effect, the same will now be more fully described with reference to the accompanying drawings in which Figures 1 and 2 illustrate, partly in section, two types of screw and nut mechanism according to the invention.

Referring to Figure 1, the mechanism comprises a lead screw 1, provided with a fine pitch thread having, for example, 18 turns per inch, and the screw 1 may be mounted so as to be capable of rotation about its axis but incapable of axial movement. On the screw 1 is mounted a nut device, indicated generally at 2, which comprises three individual nuts 3 of identical construction each nut 3 being provided with a helical thread, for engagement with, for example, three turns of the thread on screw 1.

As shown, nuts 3 are coaxially arranged and are spaced apart by a distance preferably of the order of six turns of the thread on screw 1, that is, a distance equal to twice the axial length of the thread of each nut 3.

The nuts 3 are housed in a cage 4 of annular construction, comprising a tubular portion 5 of any suitable cross-sectional shape, for example, circular or polygonal, and end walls 6, which are provided with centrally disposed apertures 7 of a size sufficient to allow unimpeded passage of screw 1. In addition the cage 4 is divided into compartments by means of partition members 8 which are apertured in a manner similar to the end walls 6. The number of compartments corresponds to the number of nuts 3 used in the device 2.

Between the end surfaces of each nut 3 and the adjacent compartment walls are provided resilient means shown as compression springs 9. Thus, in the embodiment illustrated in Figure 1 there is a total of six springs which serve to maintain each nut 3 centrally disposed with respect to the walls of its compartment in cage 4. A pin 10, the ends of which may be secured to the end wall 6 of cage 4, projects through apertures in the springs 9 and nuts 3 so as to prevent angular movement of the nuts 3 relative to one another or to the cage 4.

In operation rotation of screw 1 results in axial movement of nuts 3 and hence cage 4, and if the thread on screw 1 is exactly uniform, the nuts 3 will move to exactly the same extent. However, if there are irregularities in the thread of screw 1, the nuts 3 will move axially relatively to one another, and the nut 3 engaging the irregular portion of the thread will compress one or the other of its associated springs 9. In a practical application of screw and nut mechanism of the type illustrated in Figure 1, a movable part of the apparatus with which the mechanism is used is coupled to the cage 4 such that in moving along the screw 1 it has to overcome a restraining force, and in accordance with the invention the springs 9 are of such strength that the cage 4 and hence the movable part of the apparatus cannot be moved by the axial movement of one nut 3, but is moved only when at least two nuts 3 are moved to substantially the same extent. When, therefore, an irregularity in the threads of screw 1 is reached, and assuming that this irregularity does not extend for an axial distance such that it is engaged by more than one nut 3, the particular nut 3 engaging the irregularity is permitted to move slightly in an axial direction without affecting the general movement of the cage 4 and the movable part of the apparatus. This general movement of cage 4 will then be in accordance with the average movement of all the individual nuts 3.

If desired the movable part of the apparatus may be spring loaded or otherwise arranged to provide a steady force opposing the movement of the cage 4, the loading being adjusted so as to prevent movement of cage 4 unless at least two nuts 3 are moved to the same extent.

With screw and nut mechanisms incorporating a nut device 2 as described with reference to Figure 1, it is found that relatively large irregularities in the thread of screw 1 can be absorbed by the relative axial movements of the nuts 3, and the resulting movement of the cage 4 is substantially uniform in accordance with the average pitch of the thread on screw 1.

Although it is preferred to use nuts 3 which encircle the screw 1, it is to be understood that the invention includes arrangements in which part nuts are employed to engage only a portion of the periphery of screw 1.

In the embodiment of the invention as illustrated in Figure 2, the screw comprises a cylindrical sleeve 11 carrying an internal screw-thread which may have a pitch similar to that of lead screw 1 of Figure 1. The nut device is mounted at the end of a shaft 12, and it comprises three individual nuts 13 each provided with a peripheral helical thread for engagement with a few turns of the thread carried by sleeve 11. The nuts 13 are mounted co-axially on shaft 12 so as to be movable axially thereof, for limited movement between rigid discs 14 and 15 fixed on the shaft 12. The nuts 13 are equally spaced with respect to each other and the discs 14 and 15 by resilient means shown as rubber discs 16.

A pin 17 similar to pin 10 of Figure 1, has its ends secured to the rigid discs 14 and 15, and in addition passes through apertures provided in the nuts 13 and the rubber discs 16 thereby to prevent angular movement of the components of the nut device relatively to one another.

The operation of the mechanism illustrated in Figure 2 is, in principle, the same as that described with reference to Figure 1, but the two embodiments differ in that, in the arrangement according to Figure 1 the thrust from screw 1 is transmitted to the cage 4 through a number of springs 9 acting in parallel, whereas in Figure 2 the thrust exerted on shaft 12 as a result of rotation of sleeve 11 is transmitted through a number of rubber discs 16 in series, and for this reason, each disc 16 must be under a compressive force exceeding the force opposing axial movement of shaft 12. Thus this latter arrangement is more suitable for use with light loads.

It will be appreciated that the nut device illustrated in Figure 2 can be adapted for use with an externally-threaded lead screw by substituting individual nuts of the type shown in Figure 1 for the nuts 13, and by housing the nuts in a cage similar to cage 4 of Figure 1 but with the partition members 8 omitted. Similarly the nut device 2 (Figure 1) can be modified for use with an internally threaded sleeve by mounting peripherally threaded individual nuts and compression spring such as 9 (Figure 1) co-axially on a shaft, but with each nut and its associated springs separated by means of a rigid disc fixed to the shaft.

In general the form of the resilient means hereinbefore referred to, will depend amongst other things on the loads likely to be placed on the mechanism, and when using either of the embodiments shown in Figures 1 and 2 or obvious modifications thereof, the resilient means illustrated, respectively, as compression springs and rubber discs can be inter-changed or substituted by any other form of resilient means capable of exerting a restoring force on the individual nuts.

Whilst the invention has been described and illustrated with reference to a nut device comprising three individual nuts, it will be apparent that this is the simplest form of the invention, and depending on particular requirements any larger number of individual nuts may be used, provided that relative movement between the screw and nut device takes place only if the majority of the individual nuts move relatively to the screw to substantially the same extent.

What I claim is:

1. A nut device comprising at least three individual co-axial nuts each provided with a helical thread, mounting means including rigidly spaced-apart end members, said nuts being positioned between said end members in spaced-apart and axially movable relationship relatively to one another and to said end members, means holding said nuts against rotational movement relatively to said end members, and resilient means disposed between adjacent nuts and between each end member and the nut adjacent thereto to hold said nuts and said end members in said spaced-apart relationship and to provide a restoring force opposing relative axial movement.

2. A nut device comprising at least three individual co-axial nuts each provided with a helical thread, a rigid cage having spaced-apart end walls, said nuts being positioned between said end walls in spaced-apart and axially movable relationship relatively to one another and to said end walls, means holding said nuts against rotational movement relatively to said end walls, and resilient means disposed between adjacent nuts and between each end wall and the nut adjacent thereto to hold said nuts and said end walls in said spaced-apart relationship and to provide a restoring force opposing relative axial movement.

3. A nut device comprising at least three individual co-axial nuts each provided with a helical thread, a rigid cage having spaced-apart end walls and intermediate partition walls defining a plurality of separate compartments, one of said nuts being positioned in each of said compartments for limited axial movement, means holding said nuts against rotational movement relatively to said cage, and resilient means disposed in each of said compartments between the walls thereof and the nut positioned therein to space said nut from said walls and to provide a restoring force opposing said axial movement.

4. A screw and nut mechanism comprising a nut device for co-operative engagement with a helically-threaded screw, said device comprising at least three individual nuts each provided with a helical thread complementary to the thread of said screw, mounting means for said nuts including rigidly spaced-apart end members, said nuts being positioned between said end members in spaced-apart and axially movable relationship relatively to one another and to said end members, means holding said nuts against rotational movement relatively to said end members, and resilient means disposed between adjacent nuts and between each end member and the nut adjacent thereto to hold said nuts and said end members in said spaced-apart relationship and to provide a restoring force opposing relative axial movement.

5. A screw and nut mechanism comprising a nut device for co-operative engagement with a helically-threaded screw, said device comprising at least three individual nuts each provided with a helical thread complementary to the thread of said screw, a rigid cage having spaced-apart end walls, said nuts being positioned between said end walls in spaced-apart and axially movable relationship relatively to one another and to said end walls, means holding said nuts against rotational movement relatively to said end walls, and resilient means disposed between adjacent nuts and between each end wall and the nut adjacent thereto to hold said nuts and said end walls in said spaced-apart relationship and to provide a restoring force opposing relative axial movement.

6. A screw and nut mechanism comprising a nut device for co-operative engagement with a helically threaded screw, said device comprising at least three individual nuts each provided with a helical thread complementary to the thread of said screw, a rigid cage having spaced-apart end walls and intermediate partition walls defining a plurality of separate compartments, one of said nuts being positioned in each of said compartments for limited axial movement, means holding said nuts against rotational movement relatively to said cage, and resilient means disposed in each of said compartments between the walls thereof and the nut positioned therein to space the nut from said walls and to provide a restoring force opposing said axial movement.

7. Apparatus incorporating a screw and nut mechanism comprising a nut device in co-operative engagement with a helically-threaded screw, said device comprising at least three individual nuts each provided with a helical thread complementary to the thread of said screw, mounting means for said nuts including rigidly spaced-apart end members, said nuts being positioned between said end members in spaced-apart and axially movable relationship relatively to one another and to said end members, means holding said nuts against rotational movement relatively to said end members, and resilient means disposed between adjacent nuts and between each end member and the nut adjacent thereto to hold said nuts and said end members in said spaced-apart relationship and to provide a restoring force opposing relative axial movement, said screw and said device being coupled to parts of said apparatus arranged for relative rectilinear movement in response to relative rotary movement between said screw and said device, and said relative rectilinear movement being derived from the average movement of a majority of said nuts moving relatively to said screw axially thereof at substantially the same rate.

HERBERT EDWARD HOLMAN.

References Cited in the file of this patent

UNITED STATES PATENTS

| Number | Name | Date |
| --- | --- | --- |
| 1,903,053 | Kuba | Mar. 28, 1933 |
| 2,393,924 | Millus | Jan. 29, 1946 |
| 2,447,439 | Thompson | Aug. 17, 1948 |
| 2,482,082 | Wahlberg | Sept. 13, 1949 |